United States Patent
Hashimoto

(10) Patent No.: US 9,769,740 B2
(45) Date of Patent: Sep. 19, 2017

(54) MOBILE DEVICE, CONTROL METHOD, AND NON-TRANSITORY STORAGE MEDIUM

(71) Applicant: KYOCERA Corporation, Kyoto-shi, Kyoto (JP)

(72) Inventor: Sunao Hashimoto, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/204,999

(22) Filed: Jul. 8, 2016

(65) Prior Publication Data

US 2017/0013624 A1    Jan. 12, 2017

(30) Foreign Application Priority Data

Jul. 9, 2015    (JP) ................................. 2015-138174

(51) Int. Cl.
| | |
|---|---|
| H04W 4/00 | (2009.01) |
| H04W 48/16 | (2009.01) |
| H04W 48/20 | (2009.01) |
| H04W 72/02 | (2009.01) |
| H04W 72/04 | (2009.01) |

(52) U.S. Cl.
CPC ........... *H04W 48/16* (2013.01); *H04W 48/20* (2013.01); *H04W 72/02* (2013.01); *H04W 72/048* (2013.01)

(58) Field of Classification Search
None
See application file for complete search history.

(56) References Cited

U.S. PATENT DOCUMENTS

| | | | | |
|---|---|---|---|---|
| 2013/0151870 A1* | 6/2013 | Chuang | ..................... | G06F 1/26 713/300 |
| 2014/0051352 A1* | 2/2014 | Wolfe | ..................... | H04B 13/02 455/40 |
| 2016/0042629 A1* | 2/2016 | Snyder | ..................... | G08B 21/08 340/573.6 |

FOREIGN PATENT DOCUMENTS

JP    2005-20422 A    1/2005

* cited by examiner

*Primary Examiner* — Shantell L Heiber
(74) *Attorney, Agent, or Firm* — Hauptman Ham, LLP

(57) ABSTRACT

In one aspect, a mobile device comprises a transceiver and a controller. The transceiver communicates with another device in a plurality of frequency bands. The plurality of frequency bands includes a first frequency band and a second frequency band. The first frequency band has a lower frequency than the second frequency band. The controller uses the first frequency band in preference to the second frequency band in a first case where an own mobile device is estimated to be immersed in water based on a value detected by at least one sensor. The controller uses the second frequency band in preference to the first frequency band in a second case where the own mobile device is not estimated to be immersed in water based on a value detected by the at least one sensor.

12 Claims, 3 Drawing Sheets

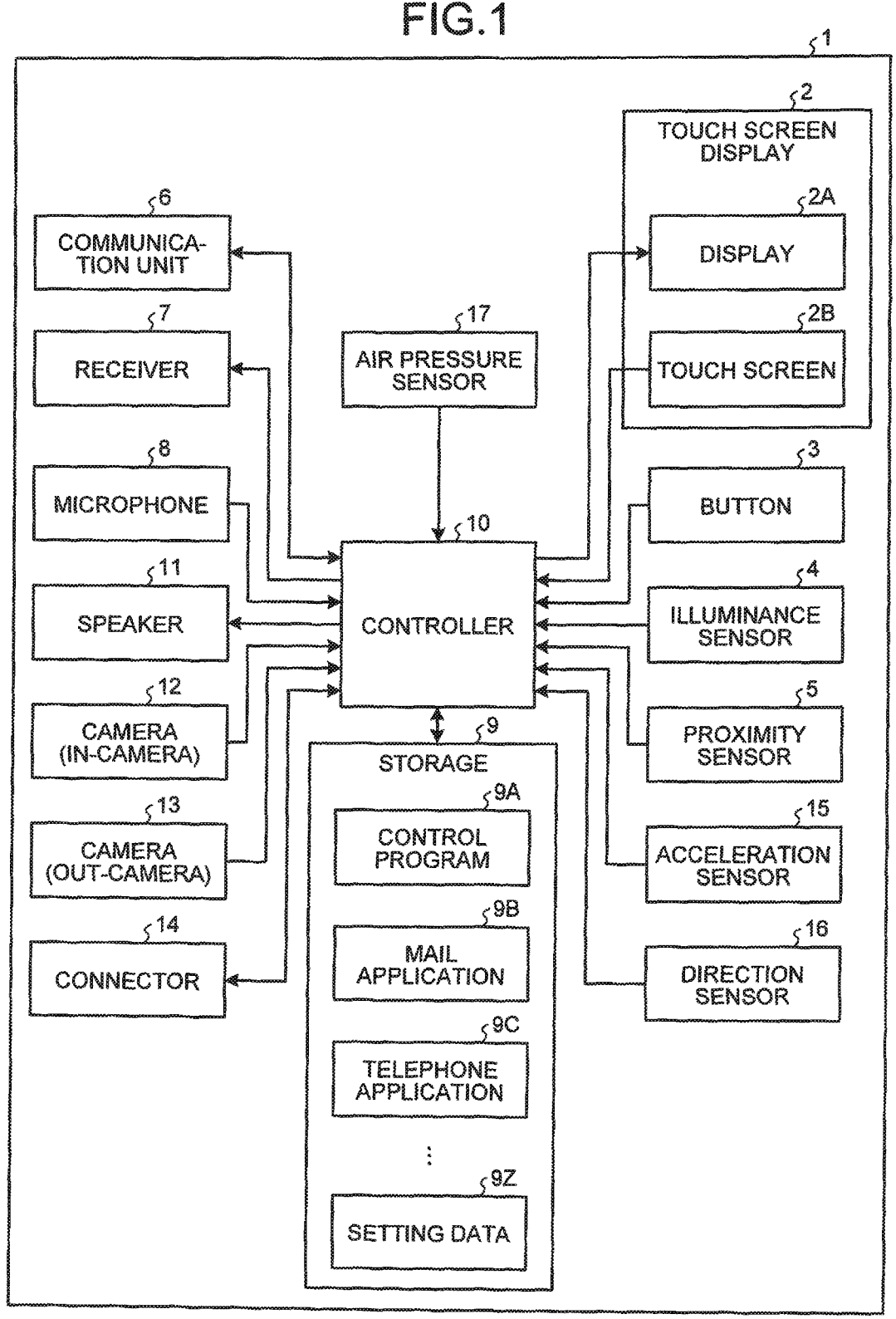

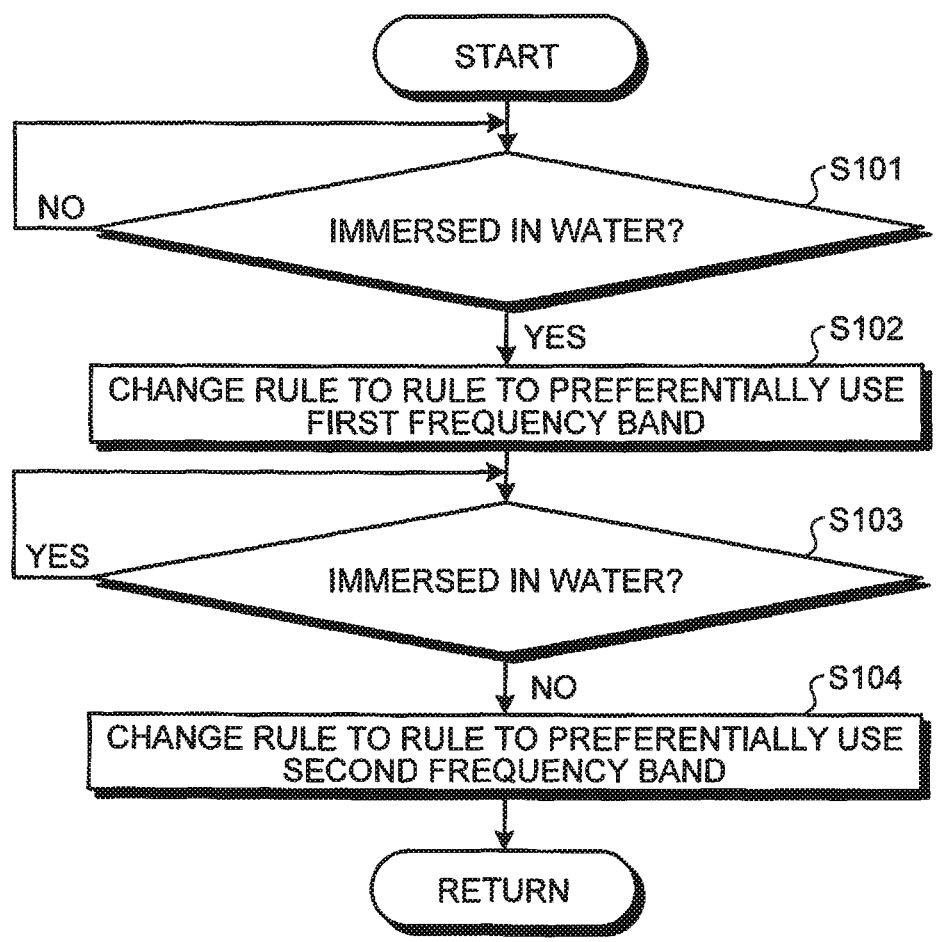

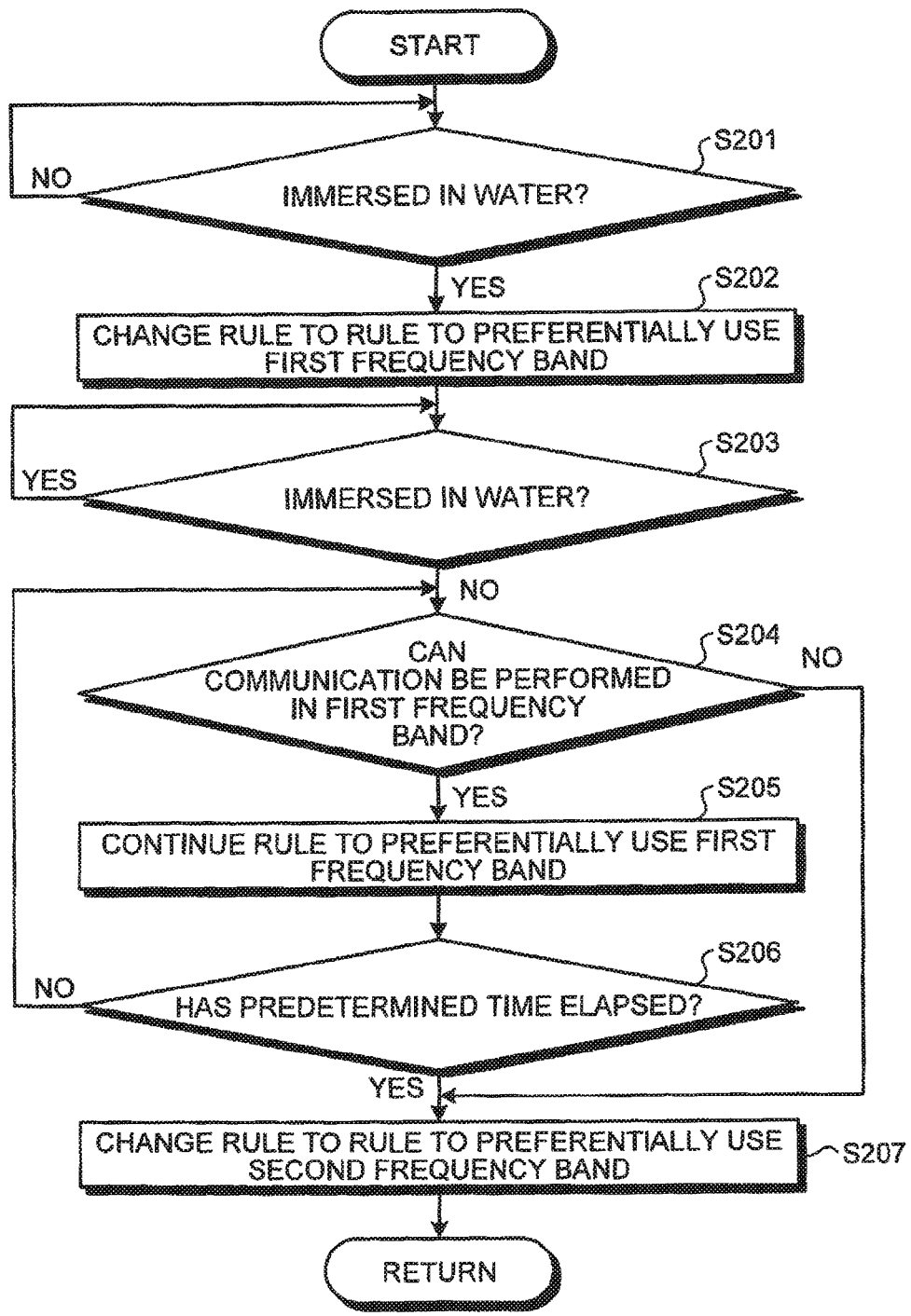

US 9,769,740 B2

MOBILE DEVICE, CONTROL METHOD, AND NON-TRANSITORY STORAGE MEDIUM

CROSS-REFERENCE TO RELATED APPLICATION(S)

The present application claims priority to and incorporates by reference the entire contents of Japanese Patent Application No. 2015-138174 filed in Japan on Jul. 9, 2015.

BACKGROUND

1. Field of the Invention

The present application relates to a mobile device, a control method, and a control program.

2. Description of the Related Art

Conventionally, there are terminals capable of communicating with external devices via wireless communication. A plurality of frequency bands is used for wireless communication. Some devices are capable of wireless communication even in water.

Patent Literature 1: Japanese Laid-open Patent Publication No. 2005-20422 A

There is room for improvement in a method for selecting a frequency band that is used for communication.

SUMMARY

It is an object of the present invention to at least partially solve the problems in the conventional technology.

According to one aspect, there is provided a mobile device comprising a transceiver and a controller, wherein the transceiver is configured to communicate with another device in a plurality of frequency bands, the plurality of frequency bands includes a first frequency band and a second frequency band, the first frequency band has a lower frequency than the second frequency band, the controller is configured to use the first frequency band in preference to the second frequency band in a first case where an own mobile device is estimated to be immersed in water based on a value detected by at least one sensor, and the controller is configured to use the second frequency band in preference to the first frequency band in a second case where the own mobile device is not estimated to be immersed in water based on a value detected by the at least one sensor.

According to one aspect, there is provided a control method executed by a mobile device including a transceiver and a controller, the control method comprising: communicating with another device in a plurality of frequency bands including a first frequency band and a second frequency band having a higher frequency than the first frequency band; communicating with the other device using the first frequency band in preference to the second frequency band in a first case where an own mobile device is estimated to be immersed in water based on a value detected by at least one sensor; and communicating with the other device using the second frequency band in preference to the first frequency band in a second case where the own mobile device is not estimated to be immersed in water based on a value detected by the at least one sensor.

According to one aspect, a non-transitory storage medium that stores a control program that causes a mobile device including a transceiver and a controller to execute:

communicating with another device in a plurality of frequency bands including a first frequency band and a second frequency band having a higher frequency than the first frequency band;

communicating with the other device using the first frequency band in preference to the second frequency band in a first case where an own mobile device is estimated to be immersed in water based on a value detected by at least one sensor; and communicating with the other device using the second frequency band in preference to the first frequency band in a second case where the own mobile device is not estimated to be immersed in water based on a value detected by the at least one sensor.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram illustrating a functional configuration of a smartphone according to one embodiment;

FIG. 2 is a flowchart illustrating an exemplary process that is executed by a smartphone according to one embodiment; and FIG. 3 is a flowchart illustrating an exemplary process that is executed by a smartphone according to one embodiment.

DETAILED DESCRIPTION OF THE PREFERRED EMBODIMENTS

A plurality of embodiments for practicing a mobile device, a control method, and a control program according to the present application will be described in detail with reference to the drawings. In the following description, a smartphone will be referred to as an example of the mobile device according to the present application.

An exemplary functional configuration of a smartphone 1 according to an example of a plurality of embodiments will be described with reference to FIG. 1. FIG. 1 is a block diagram illustrating a functional configuration of the smartphone 1. In the following description, similar components might be denoted by the same reference signs. Furthermore, overlapping explanations might be omitted.

As illustrated in FIG. 1, the smartphone 1 includes a touch screen display 2, a button 3, an illuminance sensor 4, a proximity sensor 5, a communication unit 6, a receiver 7, a microphone 8, a storage 9, a controller 10, a speaker 11, a camera 12, a camera 13, a connector 14, an acceleration sensor 15, a direction sensor 16, and an air pressure sensor 17. In the following description, the smartphone 1 will also be referred to as an "own smartphone".

The touch screen display 2 has a display 2A and a touch screen 2B. The display 2A and the touch screen 2B may be, for example, positioned to overlap each other, positioned side by side, or positioned apart from each other. When the display 2A and the touch screen 2B are positioned to overlap each other, for example, one or more sides of the display 2A may not be along any of sides of the touch screen 2B.

The display 2A includes a display device such as a liquid crystal display (LCD), an organic electro-luminescence display (OELD), or an inorganic electro-luminescence display (IELD). The display 2A displays, in a screen, an object such as a character, an image, a symbol, and a figure. The screen containing an object such as a character, an image, a symbol, and a figure displayed by the display 2A includes a screen called a lock screen, a screen called a home screen, and an application screen that is displayed during execution of an application. The home screen is also called a desktop, a standby screen, an idle screen, a standard screen, an application list screen, or a launcher screen.

The touch screen 2B detects that a finger, a pen, a stylus pen or the like comes into contact with or proximity to the touch screen 2B. The touch screen 2B can detect a position on the touch screen 2B when a plurality of fingers, pens, stylus pens or the like comes into contact with or proximity to the touch screen 2B. The plurality of fingers, pens, stylus pens or the like detected by the touch screen 2B will also be referred to as a "finger". A position detected by the touch screen 2B with/to which a finger has come into contact/proximity will also be referred as a "detection position". The touch screen 2B notifies the controller 10 of the contact of the finger with the touch screen 2B together with the detection position. The operation that can be performed by the touch screen 2B can be executed by the touch screen display 2 having the touch screen 2B. In other words, the operation that is performed by the touch screen 2B may be performed by the touch screen display 2. In some embodiments, the touch screen 2B measures information for estimating whether the own smartphone is immersed in water. When a capacitance method is employed as a detection method, the touch screen 2B measures a change in capacitance as the information for estimating whether the own smartphone is immersed in water. The touch screen 2B repeatedly applies a predetermined signal to each of a plurality of sensor electrodes spread over the touch screen 2B in a grid-like pattern to read an output value from each of the sensor electrodes. This allows the touch screen 2B to measure a change in capacitance at a detection position on the touch screen 2B. When a resistance film method or a load detection method is employed as another detection method, the touch screen 2B may detect, for example, a change in magnitude of voltage as the information for estimating whether the own smartphone is immersed in water. When a surface acoustic wave method is employed as another detection method, the touch screen 2B may detect, for example, attenuation of a surface acoustic wave transmitted by the own smartphone as the information for estimating whether the own smartphone is immersed in water. When an infrared method is employed as another detection method, the touch screen 2B may detect, for example, attenuation of infrared light transmitted by the own smartphone as the information for estimating whether the own smartphone is immersed in water.

The controller 10 determines a type of a gesture based on at least one of contact detected by the touch screen 2B, a position where the contact has been detected, a change in the position where the contact has been detected, an interval at which the contact has been detected, and the number of times that the contact has been detected. The operation that can be performed by the controller 10 can be executed by the smartphone 1 having the controller 10. In other words, the operation that is performed by the controller 10 may be performed by the smartphone 1. The gesture is an operation that is performed for the touch screen 2B using a finger. The operation that is performed for the touch screen 2B may be performed for the touch screen display 2 having the touch screen 2B. Examples of the gesture determined by the controller 10 through the touch screen 2B include, but are not limited to, a touch, a long touch, a release, a swipe, a tap, a double tap, a long tap, a drag, a flick, a pinch-in, a pinch-out, etc.

The button 3 accepts operation input from a user. The number of buttons 3 may be one or more.

The illuminance sensor 4 detects illuminance. The illuminance is a value of a luminous flux that enters a unit area of a measurement surface of the illuminance sensor 4. The illuminance sensor 4 is, for example, used for adjusting luminance of the display 2A.

The proximity sensor 5 detects existence of a neighboring object in a non-contact manner. The proximity sensor 5 detects existence of an object based on a change in a magnetic field, a change in a returning time of a reflected wave of ultrasound or the like. The proximity sensor 5 detects, for example, that the display 2A and a face have come close to each other. The illuminance sensor 4 and the proximity sensor 5 may be configured as a single sensor. The illuminance sensor 4 may be used as the proximity sensor.

The communication unit 6 performs wireless communication. Examples of a wireless communication standard supported by the communication unit 6 include, but are not limited to, a communication standard for a cellular phone such as 2G, 3G, and 4G, a communication standard for near-field wireless communication, etc. Examples of the communication standard for a cellular phone include, but are not limited to, long term evolution (LTE), wideband code division multiple access (W-CDMA), worldwide interoperability for microwave access (WiMAX, registered trademark), CDMA2000, personal digital cellular (PDC), global system for mobile communications (GSM, registered trademark), personal handy-phone system (PHS), etc. Examples of the communication standard for near-field wireless communication include, but are not limited to, IEEE802.11, Bluetooth (registered trademark), infrared data association (IrDA), near field communication (NFC), wireless personal area network (WPAN), etc. An example of a communication standard for WPAN includes, but is not limited to, ZigBee (registered trademark), etc. The communication unit 6 may support one or more of the above-mentioned communication standards.

The communication unit 6 communicates with another device in a plurality of frequency bands. The plurality of frequency bands includes a first frequency band, a second frequency band, and a third frequency band. The first frequency band has a lower frequency than the second frequency band. The third frequency band is a frequency band different from the first frequency band and the second frequency band. For example, the first frequency band is a frequency band of about 700 to 900 megahertz. For example, the second frequency band is a frequency band of about 1.1 to 1.5 gigahertz. A communication standard that uses the first frequency band and the second frequency band includes LTE. The third frequency band includes frequency bands of 2.5 gigahertz and 5 gigahertz, a sub-millimeter wave band, and a millimeter wave band. A communication standard that uses the third frequency band includes IEEE802.11. The communication unit 6 is an example of a transceiver.

The receiver 7 is an example of a sound output module. The receiver 7 outputs, as sound, a sound signal transmitted from the controller 10. The receiver 7 can output, for example, sound of video and sound of music played by the smartphone 1, and voice of an opposite party during a telephone conversation. The microphone 8 is an example of a sound input module. The microphone 8 converts voice of a user or the like to a sound signal, and transmits the sound signal to the controller 10.

The storage 9 can store a program and data. The storage 9 may be used as a work area that temporarily stores a processing result of the controller 10. The storage 9 may include any non-transitory storage medium such as a semiconductor storage medium and a magnetic storage medium. The storage 9 may include a plurality of types of storage media. The storage 9 may include a combination of a storage medium such as a memory card, an optical disk, or a magneto-optical disk and a reading device for the storage medium. The storage 9 may include a storage device that is used as a temporary storage area such as a random access memory (RAM).

The program stored in the storage 9 includes an application that is executed in the foreground or the background, and a basic program that supports operation of the application. A screen of the application is displayed on the display 2A when, for example, the application is executed in the foreground. An example of the basic program includes, but is not limited to, an OS, etc. The application and the basic program may be installed in the storage 9 via wireless communication using the communication unit 6 or via the non-transitory storage medium.

The storage 9 can store a control program 9A, a mail application 9B, a telephone application 9C, and setting data 9Z or the like.

The control program 9A can provide a function to estimate whether the own smartphone is immersed in water based on a value detected by the sensor. The value detected by the sensor includes at least one of a change in capacitance measured by the touch screen 2B and a value of air pressure measured by the air pressure sensor 17. The control program 9A may cause such an estimation that the own smartphone is immersed in water when, for example, capacitance of the entire surface of the touch screen 2B of the capacitance method represents a substantially uniform value.

In a first case where the own smartphone is estimated to be immersed in water based on a value detected by the sensor, the control program 9A can provide a function to use the first frequency band in preference to the second frequency band. In a second case where the own smartphone is not estimated to be immersed in water based on a value detected by the sensor, the control program 9A can provide a function to use the second frequency band in preference to the first frequency band.

The control program 9A can provide a function to cause a preferential search for a base station capable of communication in a priority frequency band that is used preferentially from among the first frequency band and the second frequency band. When the base station capable of communication in the priority frequency band is searched for, the control program 9A can provide a function not to search for a base station capable of communication in the other frequency band.

The control program 9A can provide a function to communicate with another device in any one of the first frequency band and the second frequency band.

The control program 9A can provide a function to use, for continuous communication, the priority frequency band that is being used preferentially from among the first frequency band and the second frequency band, and to use the other frequency band for auxiliary communication.

The control program 9A can provide a function to combine the third frequency band with the frequency band of at least one of the first frequency band and the second frequency band to perform communication.

When the base station capable of communication in the first frequency band is searched for during the above-mentioned first case, the control program 9A can provide a function to use the first frequency band in preference to the second frequency band for a predetermined time after a shift from the above-mentioned first case to the above-mentioned second case.

The control program 9A can provide a function to use the first frequency band in preference to the second frequency band soon after a shift from the above-mentioned second case to the above-mentioned first case.

When the own smartphone is estimated to be immersed in water based on a value detected by the sensor, the control program 9A can also provide a function to change a rule to use a plurality of frequency bandwidths. In relation to this function, when the own smartphone is estimated to be immersed in water, the control program 9A can provide a function to change the above-mentioned rule so as to preferentially use a frequency bandwidth having a low frequency from among the plurality of frequency bandwidths. Furthermore, when the base station capable of communication is searched for while the own smartphone is estimated to be immersed in water, the control program 9A can provide a function to change the above-mentioned rule so as to preferentially use a frequency band capable of communicating with the base station for a predetermined time after the own smartphone is estimated to be not immersed in water.

The mail application 9B can provide an e-mail function for, for example, composing, transmitting, receiving, and displaying an e-mail. The telephone application 9C can provide a telephone conversation function for a telephone conversation by means of wireless communication.

The setting data 9Z are configured to include various types of data that are used for a process executed on the basis of the function provided by the control program 9A or the like. The setting data 9Z include data regarding a change in capacitance for estimating whether the own smartphone is immersed in water. The setting data 9Z include data regarding a change in air pressure for estimating whether the own smartphone is immersed in water. The setting data 9Z include data of a predetermined time for which the first frequency band is used in preference to the second frequency band after a shift from the above-mentioned first case to the above-mentioned second case. The setting data 9Z include data of a predetermined time for which the frequency band capable of communicating with the base station is preferentially used after the own smartphone is estimated to be not immersed in water. The setting data 9Z include data of the rule (algorism) that is applied when the frequency band is used.

The controller 10 includes an arithmetic processing device. Examples of the arithmetic processing device include, but are not limited to, a central processing unit (CPU), a system-on-a-chip (SoC), a micro control unit (MCU), a field-programmable gate array (FPGA), a coprocessor, etc. The controller 10 integrally controls operation of the smartphone 1 to realize various types of functions. The controller 10 is an example of a controller.

Specifically, the controller 10 executes an instruction included in the program stored in the storage 9 while referring to the data stored in the storage 9 as necessary. The controller 10 controls a function module in accordance with the data and the instruction, thereby realizing various types of functions. Examples of the function module include, but are not limited to, at least one of the display 2A, the communication unit 6, the microphone 8, the speaker 11, etc. The controller 10 might change the control in accordance with a detection result of a detection module. Examples of the detection module include, but are not limited to, at least one of the touch screen 2B, the button 3, the illuminance sensor 4, the proximity sensor 5, the microphone 8, the camera 12, the camera 13, the acceleration sensor 15, the direction sensor 16, the air pressure sensor 17, etc.

The controller 10 executes the control program 9A, thereby realizing a process or the like to estimate whether the own smartphone is immersed in water. For example, the controller 10 executes the control program 9A to realize a process to use the first frequency band in preference to the second frequency band in the first case where the own smartphone is estimated to be immersed in water based on a value detected by the sensor. For example, the controller 10 executes the control program 9A to realize a process to use the second frequency band in preference to the first frequency band in the second case where the own smartphone is not estimated to be immersed in water based on a value detected by the sensor. The value detected by the sensor includes at least one of a change in capacitance measured by the touch screen 2B and a value of air pressure measured by the air pressure sensor 17.

The controller 10 can also execute the control program 9A to realize a process to change the rule to use the plurality of frequency bandwidths when the own smartphone is estimated to be immersed in water based on a value detected by the sensor. The value detected by the sensor includes at least one of a change in capacitance measured by the touch screen 2B and a value of air pressure measured by the air pressure sensor 17.

The speaker 11 includes the sound output module. The speaker 11 outputs, as sound, a sound signal transmitted from the controller 10. The speaker 11 may output, for example, an incoming tone and music. One of the receiver 7 and the speaker 11 may provide the other function as well.

The camera 12 and the camera 13 can convert a photographed image to an electrical signal. The camera 12 may be an in-camera that photographs an object facing the display 2A. The camera 13 may be an out-camera that photographs an object facing an opposite surface of the display 2A. The camera 12 and the camera 13 may be functionally and physically integrated and mounted in the smartphone 1 as a camera unit that is usable while switching between the in-camera and the out-camera.

The connector 14 is a terminal to which another device is connected. The connector 14 may be a general terminal such as a universal serial bus (USB), a high-definition multimedia interface (HDMI, registered trademark), Light Peak (Thunderbolt, registered trademark), and an earphone-microphone connector. The connector 14 may be a dedicated terminal such as a dock connector. Examples of a device connected to the connector 14 include, but are not limited to, an external storage, a speaker, a communication device, etc.

The acceleration sensor 15 can measure a direction and magnitude of acceleration that acts on the smartphone 1. The direction sensor 16 can detect, for example, an orientation of terrestrial magnetism to measure an orientation (direction) of the smartphone 1 based on the orientation of the terrestrial magnetism. The air pressure sensor 17 can measure air pressure that acts on the smartphone 1.

The smartphone 1 may be provided with a GPS receiver and a vibrator in addition to the above-mentioned respective function modules. The GPS receiver can receive, from a GPS satellite, a radio signal in a predetermined frequency band. The GPS receiver performs a demodulation process for the received radio signal to deliver the processed signal to the controller 10. The GPS receiver supports an arithmetic process for a current location of the smartphone 1. The vibrator vibrates a part or all of the smartphone 1. The vibrator has, for example, a piezoelectric element, an eccentric motor or the like to generate a vibration. A function module such as a battery that is inevitably used for maintaining a function of the smartphone 1 and a controller that is inevitably used for realizing control of the smartphone 1 are mounted in the smartphone 1.

An exemplary process that is executed by the smartphone 1 according to embodiments will be described with reference to FIGS. 2 and 3. FIGS. 2 and 3 are flowcharts illustrating exemplary processes that are executed by the smartphone according to one embodiment. The processes illustrated in FIGS. 2 and 3 are realized when the controller 10 executes the control program 9A stored in the storage 9. The processes illustrated in FIGS. 2 and 3 are repeatedly executed during activation of the smartphone 1.

The process illustrated in FIG. 2 will be described. The controller 10 estimates whether the own smartphone is immersed in water based on at least one of a change in capacitance measured by the touch screen 2B and a value of air pressure measured by the air pressure sensor 17 (step S101).

As the result of the determination, when the controller 10 does not estimate that the own smartphone is immersed in water (step S101, No), the controller 10 repeats the determination of step S101.

On the other hand, when the controller 10 estimates that the own smartphone is immersed in water as the result of the determination (step S101, Yes), the controller 10 changes the rule to a rule to preferentially use the first frequency band (step S102).

The controller 10 estimates again whether the own smartphone is immersed in water (step S103).

As the result of the determination, when the controller 10 estimates that the own smartphone is immersed in water (step S103, Yes), the controller 10 repeats the determination of step S103.

On the other hand, when the controller 10 does not estimate that the own smartphone is immersed in water as the result of the determination (step S103, No), the controller 10 changes the rule to a rule to preferentially use the second frequency band (step S104), and returns to the processing procedure of step S101.

In the above-mentioned step S102, when the smartphone 1 preferentially uses the first frequency band, the smartphone 1 may preferentially search for the base station capable of communication in the first frequency band. When the base station is searched for in the first frequency band, the smartphone 1 may not search for the base station capable of communication in the second frequency band. Similarly, in the above-mentioned step S104, when the smartphone 1 preferentially uses the second frequency band, the smartphone 1 may use the first frequency band for auxiliary communication.

In the above-mentioned step S102, when the smartphone 1 preferentially uses the first frequency band, the smartphone 1 may use the second frequency band for auxiliary communication.

In the above-mentioned step S102, when the smartphone 1 preferentially uses the first frequency band, the smartphone 1 may combine the third frequency band with the first frequency band to perform communication.

In the above-mentioned step S104, when the smartphone 1 preferentially uses the second frequency band, the smartphone 1 may preferentially search for the base station capable of communication in the second frequency band. When the base station is searched for in the second frequency band, the smartphone 1 may not search for the base station capable of communication in the first frequency band.

In the above-mentioned step S104, when the smartphone 1 preferentially uses the second frequency band, the smartphone 1 may use the first frequency band for auxiliary communication.

In the above-mentioned step S104, when the smartphone 1 preferentially uses the second frequency band, the smartphone 1 may combine the third frequency band with the second frequency band to perform communication.

In the above-mentioned step S102, when the smartphone 1 preferentially uses the first frequency band, the smartphone 1 may use the second frequency band for auxiliary communication. Similarly, in the above-mentioned step S104, when the smartphone 1 preferentially uses the second frequency band, the smartphone 1 may use the first frequency band for auxiliary communication.

The process illustrated in FIG. 3 will be described. As illustrated in FIG. 3, the controller 10 estimates whether the own smartphone is immersed in water based on at least one of a change in capacitance measured by the touch screen 2B and a value of air pressure measured by the air pressure sensor 17 (step S201).

As the result of the determination, when the controller 10 does not estimate that the own smartphone is immersed in water (step S201, No), the controller 10 repeats the determination of step S201.

On the other hand, when the controller 10 estimates that the own smartphone is immersed in water as the result of the determination (step S201, Yes), the controller 10 changes the rule to the rule to preferentially use the first frequency band (step S202).

The controller 10 estimates again whether the own smartphone is immersed in water (step S203).

As the result of the determination, when the controller 10 estimates that the own smartphone is immersed in water (step S203, Yes), the controller 10 repeats the determination of step S203.

On the other hand, when the controller 10 does not estimate that the own smartphone is immersed in water as the result of the determination (step S203, No), the controller 10 determines whether communication can be performed in the first frequency band (step S204).

As the result of the determination, when the communication can be performed in the first frequency band (step S204, Yes), the controller 10 continues the rule to preferentially use the first frequency band (step S205).

The controller 10 determines whether a predetermined time has elapsed (step S206).

As the result of the determination, when the predetermined time has not elapsed (step S206, No), the controller 10 returns to the determination of the above-mentioned step S204.

On the other hand, when the predetermined time has elapsed as the result of the determination (step S206, Yes), the controller 10 changes the rule to the rule to preferentially use the second frequency band (step S207), and returns to the processing procedure of step S201.

In the above-mentioned step S204, when the communication cannot be performed in the first frequency band as the result of the determination (step S204, No), the controller 10 proceeds to the processing procedure of the above-mentioned step S207.

In the above-mentioned example described as one embodiment, the smartphone 1 can preferentially use the first frequency band having a lower frequency than the second frequency band in the first case where the own smartphone is estimated to be immersed in water. In the above-mentioned example described as one embodiment, the smartphone 1 can preferentially use the second frequency band having a higher frequency than the first frequency band in the second case where the own smartphone is not estimated to be immersed in water. In other words, the smartphone 1 can execute communication, in response to the movement of the own smartphone into water, by positively using a low frequency band that can suppress attenuation in water. In the above-mentioned way, the smartphone 1 can improve a method for selecting the frequency band that is used for communication.

The above-mentioned process described as one embodiment can be similarly applied to other electronic devices that are assumed to be operated in water in addition to the smartphone 1.

Characteristic embodiments have been described so far for fully and clearly disclosing a technique according to the accompanying claims. However, the accompanying claims should not be limited to the above-mentioned embodiments, and should be embodied by all the modifications and substitutable configurations that can be created by a person skilled in the art within the scope of the basic matters described in the present specification.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile device, comprising:
a transceiver; and
a controller, wherein
the transceiver is configured to communicate with another device in a plurality of frequency bands,
the plurality of frequency bands includes a first frequency band and a second frequency band,
the first frequency band has a lower frequency than the second frequency band,
the controller is configured to use the first frequency band in preference to the second frequency band in a first case where the mobile device is estimated to be immersed in water based on a value detected by at least one sensor, and
the controller is configured to use the second frequency band in preference to the first frequency band in a second case where the mobile device is not estimated to be immersed in water based on a value detected by the at least one sensor.

2. The mobile device according to claim 1, wherein the controller is configured to cause a preferential search for a base station capable of communication in a priority frequency band that is used preferentially from among the first frequency band and the second frequency band.

3. The mobile device according to claim 2, wherein when the base station capable of communication in the priority frequency band is searched for, the controller is not configured to search for a base station capable of communication in the other frequency band.

4. The mobile device according to claim 1, wherein the controller is configured to communicate with the other device in any one of the first frequency band and the second frequency band.

5. The mobile device according to claim 1, wherein the controller is configured to use, for continuous communication, the priority frequency band that is used preferentially from among the first frequency band and the second frequency band, and to use the other frequency band for auxiliary communication.

6. The mobile device according to claim 1, wherein
the transceiver is configured to communicate with another device in a third frequency band,
the third frequency band has a higher frequency than the first frequency band and the second frequency band, and
the controller is configured to combine the third frequency band with the frequency band of at least one of the first frequency band and the second frequency band to perform communication.

7. The mobile device according to claim 1, wherein when the base station capable of communication in the first frequency band is searched for during the first case, the controller is configured to use the first frequency band in preference to the second frequency band for a predetermined time after a shift from the first case to the second case.

8. The mobile device according to claim 7, wherein the controller is configured to use the first frequency band in preference to the second frequency band soon after a shift from the second case to the first case.

9. The mobile device according to claim 1, wherein the at least one sensor includes at least one of a touch screen and an air pressure sensor.

10. A mobile device, comprising:
a transceiver capable of communication in a plurality of frequency bandwidths; and
a controller configured to estimate that the mobile device is immersed in water based on a value detected by at least one sensor, wherein
the controller is configured to change a rule to use the plurality of frequency bandwidths when the mobile device is estimated to be immersed in water, and
when a base station capable of communication is searched for while the mobile device is estimated to be immersed in water, the controller is configured to change the rule so as to preferentially use a frequency band capable of communicating with the base station for a predetermined time after the mobile device is estimated to be not immersed in water.

11. A control method executed by a mobile device including a transceiver and a controller, the control method comprising:
communicating with another device in a plurality of frequency bands including a first frequency band and a second frequency band having a higher frequency than the first frequency band;
communicating with the other device using the first frequency band in preference to the second frequency band in a first case where the mobile device is estimated to be immersed in water based on a value detected by at least one sensor; and
communicating with the other device using the second frequency band in preference to the first frequency band in a second case where the mobile device is not estimated to be immersed in water based on a value detected by the at least one sensor.

12. A non-transitory storage medium that stores a control program that causes a mobile device including a transceiver and a controller to execute:
communicating with another device in a plurality of frequency bands including a first frequency band and a second frequency band having a higher frequency than the first frequency band;
communicating with the other device using the first frequency band in preference to the second frequency band in a first case where the mobile device is estimated to be immersed in water based on a value detected by at least one sensor; and
communicating with the other device using the second frequency band in preference to the first frequency band in a second case where the mobile device is not estimated to be immersed in water based on a value detected by the at least one sensor.

* * * * *